United States Patent [19]

Mounce

[11] 3,890,619

[45] June 17, 1975

[54] OMEGA NAVIGATION RECEIVER APPARATUS

[76] Inventor: George R. Mounce, 18 Bridle Path, Toronto, Ontario, Canada, M2L 1C8

[22] Filed: July 12, 1973

[21] Appl. No.: 378,634

[52] U.S. Cl.......................... 343/105 R; 343/112 R
[51] Int. Cl............................................... G01s 1/30
[58] Field of Search............ 343/105 R, 112 R, 103

[56] References Cited
UNITED STATES PATENTS

| | | | |
|---|---|---|---|
| 3,150,372 | 9/1964 | Groth, Jr......................... | 343/112 R |
| 3,715,758 | 2/1973 | Sender........................... | 343/105 R |
| 3,760,270 | 9/1973 | Irvin................................. | 324/83 D |
| 3,774,211 | 11/1973 | Naru et al....................... | 343/105 R |

Primary Examiner—Maynard R. Wilbur
Assistant Examiner—G. E. Montone
Attorney, Agent, or Firm—Dowell & Dowell

[57] ABSTRACT

Receiver apparatus for determining the phase relationship between multiple Omega signals of the same frequency which are transmitted successively by different Omega transmitter stations, the apparatus including means for also receiving Standard Time Signals, for instance from WWV, and for generating local timing and reference signals synchronized thereto which are useful in identifying the Omega stations as they are received, in generating signals marking their boundaries and in generating frequencies which are used as reference signals for purposes of comparing the phases of the received Omega signals in novel phase comparison circuitry.

15 Claims, 4 Drawing Figures

OMEGA NAVIGATION RECEIVER APPARATUS

DISCLOSURE OF INVENTION

This invention relates to receiver apparatus for receiving Omega Navigation signals from fixed-position transmitting stations, and more particularly relates to improved means for identifying the transmitted Omega signals of the various participating Omega stations and means for determining the mutual phase differences of selected ones of their transmitted Omega signals as measured at the receiver apparatus.

PRIOR ART

The characteristics and utility of transmitted Omega signals are extensively described in the literature as well as in recent patents as exemplified by U.S. Pat. No. 3,665,469 to Williams in the first three columns thereof. Omega signals are broadcast by each Omega station in repeating real-time cycles which are mutually synchronized by atomic clocks located at the Omega stations. The Omega signals are broadcast by each station in bursts of about 1 second duration, and each occupies a uniquely assigned time slot. The repeating cycle of time slots is of 10 seconds duration. Broadcasts are made on three different frequencies from each station, i.e. 10.2, 11.33 and 13.6 KHz, and the stations transmit these three frequencies in three successive different time slots which overlap time slots being used by other Omega stations to broadcast on different frequencies, i.e. the 11.33 KHz time slot of the first station is coextensive with the 10.2 KHz time slot of the second station, etc. Since no two stations transmit on the same frequency at the same time, therefore, it is necessary to compare the phases of two non-simultaneous signals of the same frequency, and it is also necessary to identify the stations whose Omega signals are being compared in order to give line-of-position meaning to the phase comparisons.

One way to identify the Omega station signals is to develop at the receiver a repeating cycle of time slots corresponding to the actual cycle of broadcasts. Hulland U.S. Pat. No. 3,689,925 divides the frequency of a local oscillator into corresponding time slots and then the operator in his system manually slews the real-time positions of these time slots back and forth until a visual indicator shows alignment of the locally generated time slots with the positions in which he receives signals from some of the Omega stations, it being assumed that the operator has a pretty good idea of which of the stations he is able to receive. Human judgement plays a considerable part in this patented system.

SUMMARY OF THE OBJECTS AND THE INVENTION

It is a major object of this invention to provide an Omega receiver system in which the Omega signal time slots are accurately and unambiguously identified by using cyclically recurring timing signals that are generated at the receiver and are then used to define the limits of the time slots in which the various Omega stations transmit, thereby identifying the stations. It is a major feature that the times of occurrence of these timing signals are automatically synchronized with Standard Time Signals broadcast separately from the Omega signals, the Standard Time Signals in the present system being received from Station WWV or WWVH of the U.S. National Bureau of Standards or from Station CHU operated by the National Research Council of Canada. In this way, the "human element" is taken out of the task of identifying the received Omega signals as to their sources, because both the limits of the individual time slots and the limits of the repeating cycles of time slots are accurately determined without reliance on human judgement.

It is another major object of this invention to provide receiver apparatus in which said timing signals are generated by dividing down the output frequency of a local oscillator using divider chains, and in which automatic synchronization is accomplished by adjusting the oscillator frequency using an error signal resulting from comparison of the timing signals with the received Standard Time Signals, and by resetting at least some of the timing chains periodically when the error of the timing signals substantially exceeds predetermined boundaries because they are out of step with the Standard Time Signals. More specifically the received Standard Time Signals occur at the rates of one burst per second and one burst per minute, and the divider chains divide the local oscillator's output into similar timing signals, i.e. one per second and one per minute. When the respective Standard Time Signal bursts and timing signals coincide, no reset occurs, although if there is only a small discrepancy an error signal is produced to adjust the oscillator frequency by small amounts. The timing chain reset means therefore provide coarse synchronization, while the adjustments in the local oscillator frequency provide fine synchronization.

Still another major object of this invention is to provide an Omega receiver in which internal reference oscillations at the Omega frequencies of 10.2, 11.33 and 13.6 kilohertz are locally generated with a very high degree of accuracy by dividing down the oscillation frequency of the same local oscillator which is maintained accurately synchronized with said received Standard Time Signals as stated in the preceeding paragraph, whereby when these reference oscillations are used to carry out phase comparisons with the received Omega signals there will be no frequency disparity between them to introduce inaccuracies.

It is another primary object of this invention to provide a highly accurate and reliable way of comparing the phases of two transmitted Omega signals of the same preselected frequency to obtain good line-of-position information. The Omega receiver apparatus has filter means for selecting one of the Omega signal frequencies at a time, i.e. 10.2, 11.33 or 13.6 KHz, and letting the various Omega signals of this frequency pass into the phase comparison circuitry regardless of which Omega transmitter initiated it, these Omega signals from different sources being identifiable only by the time slot in which they are received. The apparatus also has means for introducing the locally-generated reference oscillation of the same frequency into the phase comparison means. There are two phase-shifting means or channels in the apparatus, and there are gating means in both of those channels which are operated by the time-slot timing signals. The operator of the apparatus sets one of these gating means to enable the first phase shifting channel only during the time slot in which a first operator-selected Omega signal appears, whereby the first phase shifting channel becomes operative during that time slot to produce from said reference oscillation a first reference signal whose phase is shifted to have a predetermined phase relationship to the first selected and received Omega signal. The operator then sets the other of these gating means to enable the second phase shifting channel only during the time slot in which a second operator-selected Omega signal appears. This second phase shifting channel then takes a signal based upon the phase of the first reference signal to produce a second reference signal whose phase it then shifts until it occupies the same predetermined phase relationship to the second received Omega signal as the first reference signal occupied with respect to the first Omega signal. The amount that the phase of the first reference signal had to be shifted to produce said second reference signal having said predetermined relationship with respect to the second Omega signal is then processed and displayed as the phase difference between the first and second Omega signals so that the operator can use it to find his line-of-position on the Omega line-of-position chart for that general area of the earth's surface. The operator then selects another pair of Omega signals to get a second line-of-position, preferably crossing the first line-of-position as near to right-angle as possible.

The remainder of the procedure performed by the operator in order to obtain further confirmation of his position and obviate the possibility that he may have selected the wrong isophase curve to identify his location includes the use of one or more of the other Omega frequencies, i.e. 11.33 or 13.6 KHz. For this purpose, he retunes his receiver filter circuits to either of these other frequencies, 11.33 for example, selects the corresponding reference oscillation, and sets the gating means in the first and second phase shifting channels to select two Omega stations for comparison of the phases of their signals. These phase differences when applied to the corresponding isophase lines on the chart should identify a line passing through the same "fix" position as the previously selected isophase lines. Further checks at this frequency and/or at the other frequency of 13.6 KHz can be performed to remove all doubt as to proper lane selection on the chart, as is well known to those skilled in the art.

It should be noted that except for the selection of the desired time slots identifying the Omega transmitters whose signals are to be compared, the operator's skill is not relied upon by the present apparatus to successfully carry out its function of indicating phase differences between selected paired Omega signals.

Other more specific objects and advantages of the present apparatus will become apparent during the following discussion of the drawings.

BRIEF DESCRIPTION

Figure 1:
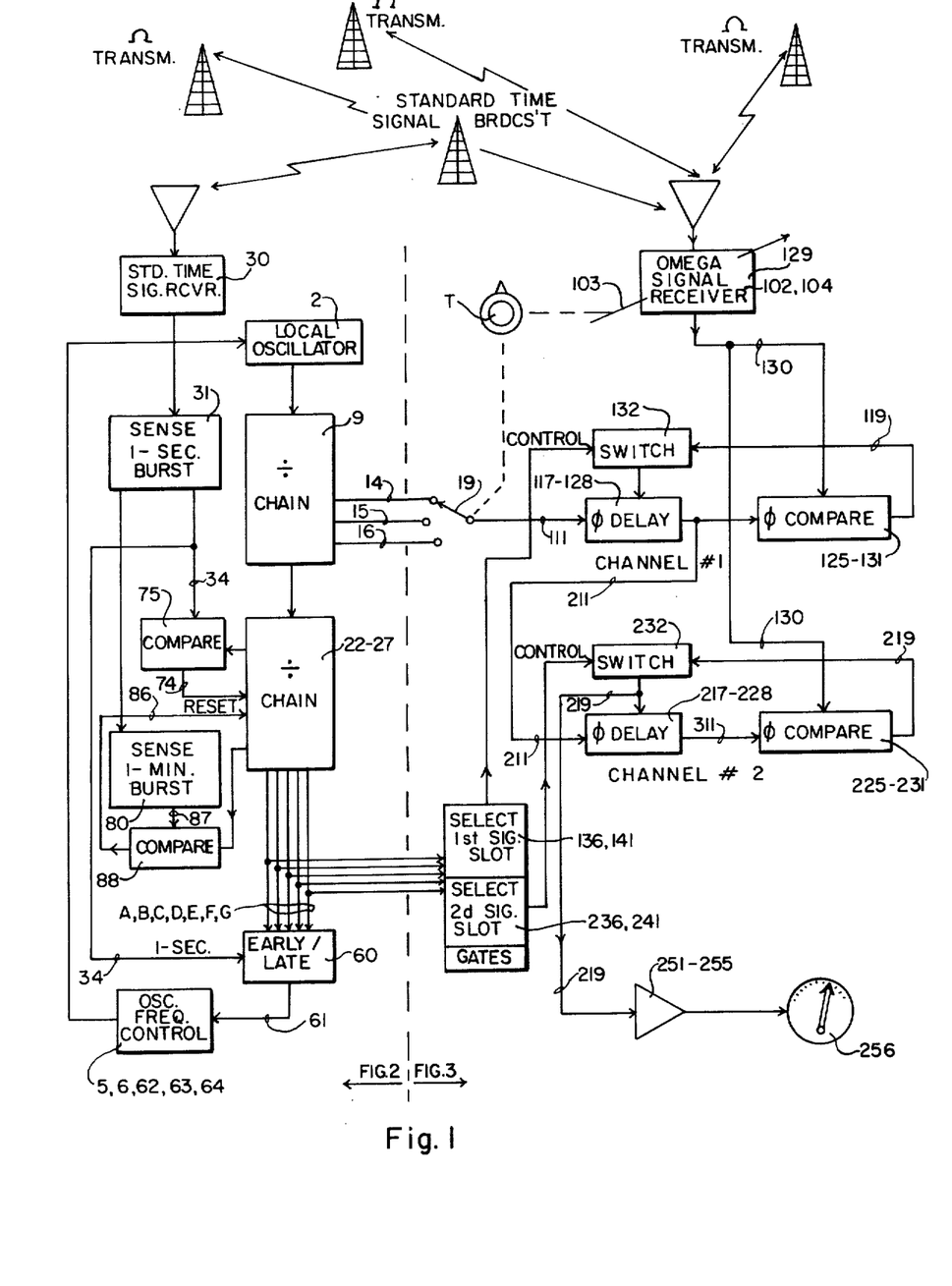
FIG. 1 is a block diagram showing the present Omega apparatus receiving Omega signals transmitted by multiple Omega transmitters, and showing a station broadcasting Standard Time Signals which are received by the present apparatus.

FIG. 1 is a simplified block diagram showing the salient features of the invention including in the upper portion of the figure an Omega receiver apparatus, carried for instance aboard a vessel, and across the top of the figure multiple differently located Omega transmitters sequentially transmitting their Omega signal bursts on 10.2, 11.33 and 13.6 KHz. In addition a Standard Time Signal station, such as WWV or WWVH or CHU, is shown, which broadcasts time signals continuously.

In the Standard Time Signal receiver apparatus a local oscillator 2 generates an oscillation which is divided down in frequency in the chain of dividers 9 to produce on wires 14, 15, and 16 Omega reference oscillations, one of which can be selected at a time by the switch 19. The Omega signal receiver 129 is very sharply tuned by suitable internal filters 102 to pick up the Omega signal transmissions, and selected signals of one of the three Omega signal frequencies can be selected by a receiver switch 103, which is ganged together with the switch 19 and operated by a common knob T so that the same frequency is selected always by both switches. These switches therefore control the frequency at which phase comparisons will be made between received pairs of Omega transmissions.

The oscillation from oscillator 2 is further divided down into timing signals occurring at 1 second, 10 seconds, and 1 minute intervals, and others as will be described below. The Standard Time Signals which are received at the receiver 30 also occur in bursts at 1 second and 1 minute. In order to achieve synchronization of the timing signals locally generated in the chain of dividers 22 through 27 with the corresponding Standard Time Signals 87 and 34, the former and the latter are respectively compared in the circuits 88 and 75. If the timing signals do not occur virtually during the Standard Time Signal bursts, reset signals appear to reset the divider chain 22 through 27 to achieve coarse reset. Moreover, the occurrences of the 1 second Standard Time Signals on wire 34 are compared with the occurrence of events A, B, C, D, and E in the timing dividers 22 through 27 to achieve an early/late error signal 61 which is applied to an oscillator frequency control circuit 5, 6, 62, 63, and 64 to change the oscillator frequency to achieve fine synchronization of the local timing signals with the Standard Time Signals. The reference numerals on FIG. 1 correspond with those on the more detailed views in FIGS. 2 and 3.

Some of these timing signals C and E are then used to define the boundaries of the known time slots in which various Omega signal transmissions are known to occur, i.e. using the gates 136, 141, 236, and 241, which can be manually preset to select any of the time slots. The operator selects two slots including received Omega signals whose relative phase is to be compared. The first selection picks a furst slot during which the switch 132 is closed in the first phase shifting channel, and the second selection picks another slot during which the switch 232 is closed in the second phase shifting channel. These selections determine which two Omega signals are compared as to their relative phases as follows:

In the first phase shifting channel the Omega signal received during the time slot when the switch 132 is closed is compared with the phase of a reference signal 211 produced by shifting the reference oscillation arriving on wire 111 using the delay 117 through 128 and the control voltage on wire 119 to automatically bring the first reference signal 211 into a predetermined phase relationship to the selected Omega signal. Other Omega signals appearing on the wire 130 during different time slots will not affect the phase of the first reference signal 211 because the switch 132 will be open during those other time slots.

A component of the first reference signal 211 is then introduced into the second phase shifting channel for comparison with the phase of a second Omega signal on wire 130 which signal was selected for this purpose by virtue of the fact that the switch 232 is closed only during the time slot occupied by the second Omega signal. The result of the comparison is to deliver a voltage on wire 219 which controls the delay 217 through 228 to bring the phase of the second reference signal appearing on wire 311 into said predetermined relationship with the phase of the second Omega signal appearing on wire 130. The amount of this phase shift of the second reference signal 311 is a direct measure of the phase relationship of the second Omega signal to the first Omega signal, and therefore this shift is displayed on the indicator 256. The process is repeated for other Omega transmissions either involving different pairs of Omega stations or involving transmissions by Omega stations on others of said Omega transmission frequencies.

DETAILED DESCRIPTION

Figure 2:
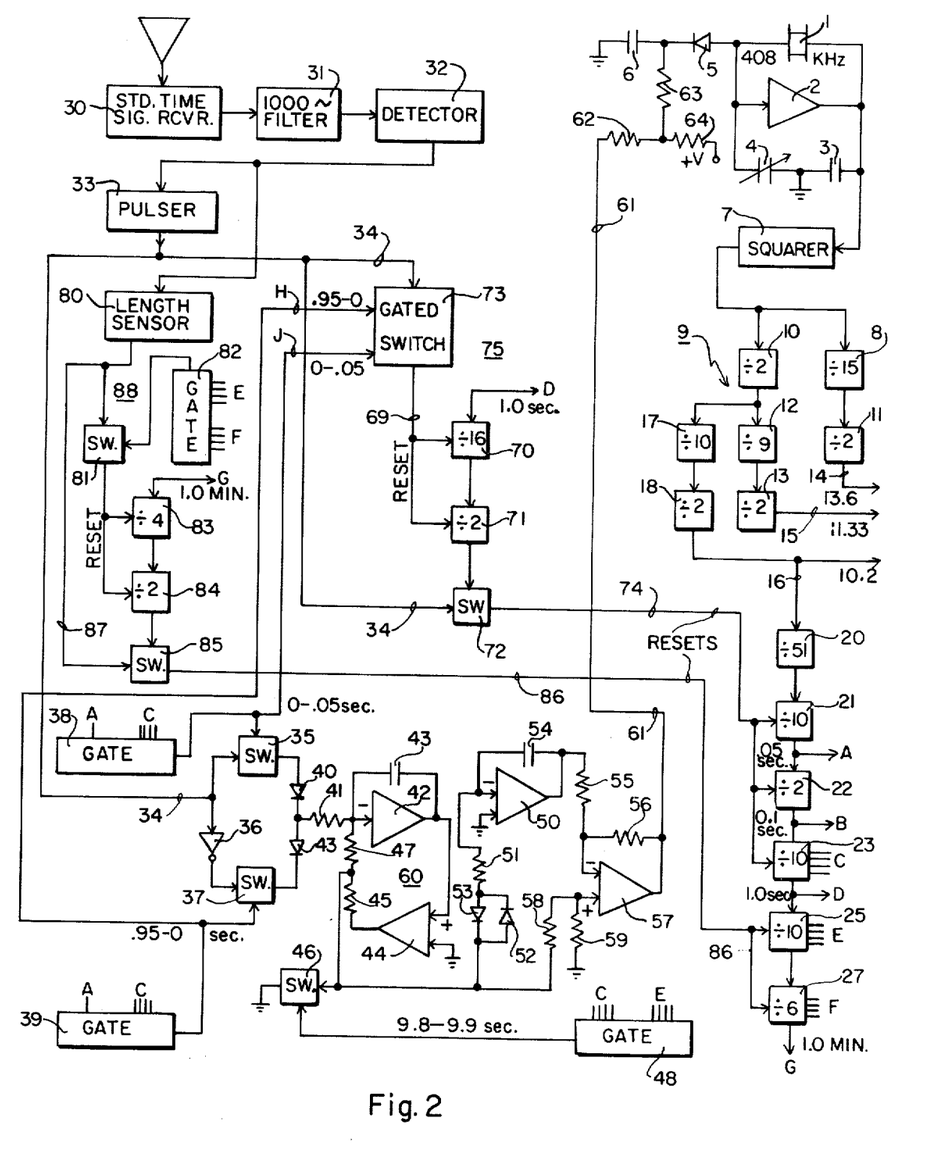
FIG. 2 is a diagram showing in greater detail a local oscillator in the present system delivering an oscillation which is divided to provide Omega reference frequencies and slot timing signals, and means for synchronizing the latter to the Standard Time Signals.
Figure 3:
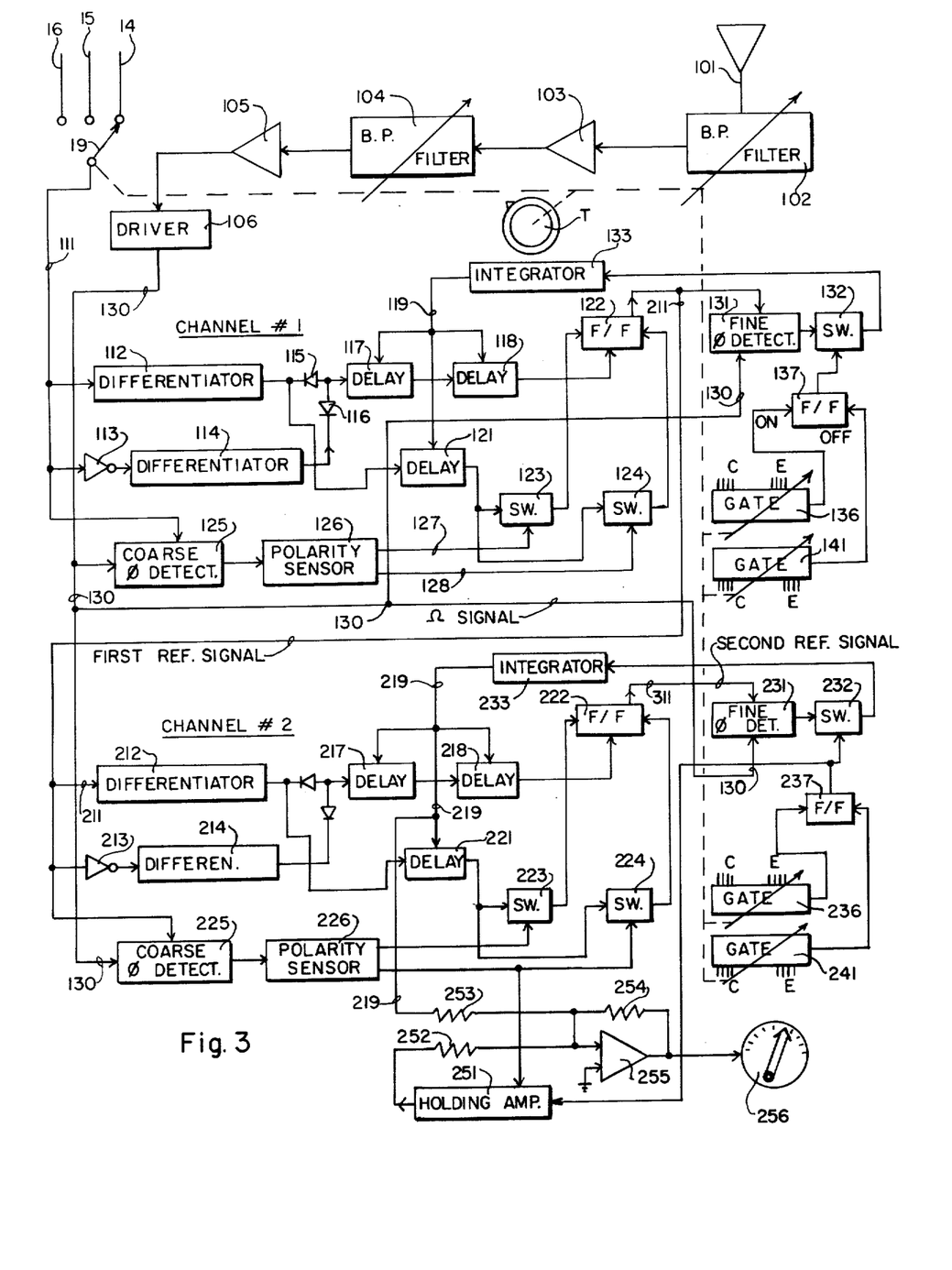
FIG. 3 is a diagram showing in greater detail the portion of the apparatus by which the Omega frequencies and the timing signals are used to compare the relative phases of two selected Omega signals broadcast by different Omega transmitters.

The reference characters appearing in FIG. 1 also appear on corresponding circuit components in FIG. 2 and FIG. 3.

FIG. 2 shows the oscillator system generating an oscillation which is divided down in divider chains to provide reference signals and timing signals, and further shows means for synchronizing the local oscillation with Standard Time Signals received, for instance from WWV, WWVH or CHU. The local oscillator provides a local frequency standard of sufficient accuracy that the phase drift of the local standard from the corresponding frequency of the Omega transmitted signals is less than 36 electrical degrees in 10 seconds to keep the error in establishing a true line-of-position within 0.5 miles. (360° is approximately equal to 18 miles.) Therefore, the frequency of the standard must agree with Omega signal frequency to an accuracy of the order of one part per million.

Referring to FIG. 2, Quartz crystal 1 together with amplifier 2, capacitor 3, variable capacitor 4, varactor diode 5 and capacitor 6 comprise a crystal-controlled oscillator. As is known in the art, the frequency of oscillation of a crystal-controlled oscillator of the parallel-resonance type can be changed slightly by varying the effective capacity across the crystal. The capacity across crystal 1, FIG. 2, comprises capacitor 3 in series with a variable capacitor 4 in parallel with varactor diode 5. Capacitor 6 is a by-pass capacitor and is large enough compared to the capacity of varactor 5 to have little influence on the effective capacity across the crystal 1. The natural period of oscillation must be such that for some setting of the variable capacitor 4 within its range, the oscillator can be tuned through the exact frequency of 408 KHz. by varying the voltage applied to the cathode of the varactor 5, as will be discussed below.

The output of the crystal-controlled oscillator as taken from amplifier 2 is applied to a squaring circuit 7, which is a pulse-forming stage having an output suitable for driving the inputs of the divider circuits 8 and 10. Divider circuit 8 has a scaling factor of 15 and drives divider circuit 11 with a scaling factor of 2 so that their total scaling factor is 30. Hence the output frequency applied to line 14 is 13.6 KHz. The divider circuit 10 has a scaling factor of 2, which, together with scaling circuit 12 having a factor of 9 and scaling circuit 13 having a factor of 2, gives an overall scaling factor of 36. Hence the output frequency applied to line 15 is 11.33 KHz. The output of divider circuit 10 with a scaling factor of 2 is also fed to scaling circuit 17 having a factor of 10, which in turn feed scaling circuit 18 having a factor of 2. The overall scaling factor is 40, and therefore the output frequency applied to line 16 is 10.2 KHz.

It will be noted that the same output frequencies could have been obtained if the crystal-controlled oscillator produced an output frequency of 204 KHz and dividers 11, 13, and 18, each having a scaling factor of 2, were eliminated. The scaling factor to produce 13.6 KHz on line 14 would then have to be 15. Since 15 divided by 2 is not a whole number, the output would be unsummetrical and not proper for the operation of subsequent circuits as will be shown later. A divide-by-2 flip-flop characteristically gives a symmetrical output with the positive and negative swings of equal duration. The three outputs of 10.2 KHz on line 16, 11.33 KHz on line 15, and 13.6 KHz on line 14 correspond to the three Omega signal frequencies transmitted by each Omega station.

The 10.2 KHz output on line 16 is fed also to scaling circuit 20 which has a dividing factor of 51. The output of scaling circuit 20 has a period of 0.005 seconds. This output is fed to decade counter 21 which in turn has an output A with a period of 0.05 seconds and is applied to the input of divider circuit 22. The output B from divider circuit 22 has a period of 0.1 seconds and is applied to decade counter 23. In addition to the 1.0 second output D from decade counter 23 applied to the input of decade counter 25, a set C of binary-coded outputs are available for use as described subsequently.

The output D from counter 23 with a period of 1.0 seconds is applied to decade counter 25, the output of which goes to scaling circuit 27 with a dividing factor of 6. The overall scaling factor is 60 for decade 25 and scaling circuit 27, so that the output G from circuit 27 has a period of 1.0 minute. Various outputs from the scaling dividers 22, 23, 25, and 27 are labelled A, B, C, D, E, F, and G, and are used in other parts of the diagrams of FIGS. 2 and 3.

The demodulated output of a receiver 30 tuned to receive Standard Time Signals for instance from WWV includes a short burst of 1000 Hz precisely at 1 second intervals, and this audio signal is selected by a filter output of filter 31. The output of filter 31 is detected at 32 and applied to the input of pulser 33. Pulser 33 is designed to respond to an envelop produced by the detector 32 due to the 1000 Hz bursts occurring at 1.0 second intervals, and to deliver a pulse suitable for driving subsequent circuits.

The output from pulser 33 is applied once per second to line 34 for fine control of the frequency of the local oscillator 2. One connection to line 34 is the input to switch 35. Switch 35 has its control input connected to the output of gate 38. Switch 35 is normally off and no output occurs until turned on by gate 38. Gate 38 produces a signal for turning "on" switch 35 when the timing signals A and C are decoded in response to a predetermined binary input. These timing signals include the 0.05 second output of scaling circuit 21 and the 1 second binary outputs 24 of decade counter 23. Using these inputs, the decoding in gate 38 is such as to produce an output to turn on switch 35 for the first 0.05 seconds after decade counter 23 resets to zero at 1.0 second intervals. If the pulse from pulser 33 arrives at switch 35 while it is turned on, an output pulse from switch 35 results which is positive-going and is applied through diode 40 and resistor 41 to the inverting input of operational amplifier 42 which functions as an integrator.

The output of pulser 33 is applied also on line 34 to the inverter 36. The output of inverter 36 has the waveform as that on line 34 except it is negative-going for the duration of the pulse. The output of inverter 36 is applied to switch 37, which is normally off and blocks passage of the signal from inverter 36 unless an on signal is applied to the control input of switch 37 from gate 39. Gate 39 is wired to decode the timing signals A and C in such a way as to produce an output to turn on switch 37 during the 0.05 second interval immediately before reset to zero of decade counter 23. If the inverted pulse initiated by pulser 33 is present at the input of switch 37 during that interval a negative-going signal appears at the output which is fed through diode 43 and resistor 41 to the inverting input of an operational amplifier 42.

Operational amplifier 42 is connected as an integrator in which the capacitor 43 is the integrating capacitor connected from the output to the input of amplifier 42. If neither switch 35 or 37 has an output, neither diode 40 or diode 43 will have a significant voltage across it and the impedance of the input circuit of amplifier 42 will be very high. Under these conditions, the output voltage of the amplifier will be virtually unchanging.

Recalling that from 0.05 seconds before decade counter 23 clears to the zero state the switch 37 is turned on and that when decade 23 clears, the switch 37 is turned "off" and the switch 35 is turned on for 0.05 seconds, there are four possibilities:

1. A pulse from pulser 33 will occur while switch 35 is turned on, in which case a positive pulse will be applied to the input of amplifier 42 and the output will change in the negative direction; or
2. A pulse from pulser 33 will occur while switch 37 is turned on, in which case a negative pulse will be applied to amplifier 42 whose output will then change in the positive direction; or
3. A pulse from pulser 33 will occur so that part of the pulse is present while switch 35 is on and part while switch 37 is on, resulting in first a negative and then a positive signal applied to amplifier 42 so that its output will be left more positive, more negative, or unchanged depending on which switch has an on condition coinciding with the presence of the pulse from pulser 33 for the greater period; or
4. No pulse from pulser 33 occurs while either switch 35 or switch 37 is turned on, in which case the output of amplifier 42 is unchanging.

For most of the time switch 46, associated with integrator amplifier 42 and amplifier 44, is closed thereby effectively shorting to ground the junction point between resistor 45 and resistor 47. Under these circumstances, amplifier 44 has no effect on amplifier 42. The control signal for determining the state of switch 46 comes from the output of gate 48. The inputs C and E to gate 48 come from the binary outputs of decade counter 23 and decade counter 25. The gate 48 is so wired that an output to turn off switch 46 occurs while a count of 8 exists in decade counter 23 and a count of 9 exists in decade 25. Therefore, switch 46 is turned off for 0.1 second in every 10 seconds.

When switch 46 is turned off, the output from amplifier 44 is applied through resistor 45 and resistor 47 to the inverting input of amplifier 42. The non-inverting input of amplifier 44 is connected to the output of amplifier 42. Assume that prior to switch 46 being turned off, the output of amplifier 42 had a significant positive value. The output of amplifier 44 would be limited at its maximum positive value. When switch 46 opens, the positive output from amplifier 44 is applied to the inverting input of amplifier 42 which, in turn, causes the output voltage of amplifier 42 to reduce toward zero at a rate determined by the circuit values, the most significant being the value of capacitor 43 and the total resistance of resistors 45 and 47. When the output voltage of amplifier 42 becomes zero, the output of amplifier 44 also becomes zero and the system is stable in that condition. The time required for the output to attain zero for specific circuit values, depends on the initial output voltage and hence the charge on capacitor 43 of amplifier 42. Similarly, if one assumed a negative output from amplifier 42 before switch 46 was turned off, the action would be to reduce the output voltage of amplifier 42 to zero in a time proportional to the initial negative output voltage. From the junction of resistor 47 an output is taken to the inverting input of amplifier 50 through back-to-back diodes 52 and 53 and through resistor 51. Amplifier 50 is connected as an integrator with capacitor 54 connected from the output to the inverting input. When switch 46 is closed, the voltage across diodes 52 and 53 is very small and their impedance very high. Under these conditions, the input of the integrator is isolated and, therefore, its output is unchanging. When switch 46 opens, during the time taken to bring the output of amplifier 42 to zero, a relatively large voltage exists at the junction of resistor 45 and 47 which, whether positive or negative, is passed via back-to-back diodes 52 and 53 to the input of the integrator through resistor 51 to change the output voltage of amplifier 50.

The output of integrator amplifier 50 is fed through input resistor 55 to the inverting input of amplifier 57. Amplifier 57 inverts the voltage from amplifier 50 and modifies its value by the ratio of resistor 55 to the feedback resistor 56. This output from amplifier 57 is an error signal used to correct the frequency of the local oscillator, and is fed by line 61 to resistor 62. Resistor 62 and resistor 63 are in series with the cathode of varactor diode 5, and resistor 64 extends from the junction of these two resistors to the positive supply for the purpose of supplying a working bias level to varactor 5.

The non-inverting input of amplifier 57 is connected through a voltage divider comprising resistors 58 and 59 with the junction of resistors 45 and 47, the same point which feeds the integrator comprising amplifier 50 and its associated components. When switch 46 opens and the outpus of amplifiers 42 and 44 go to zero, during the zeroing process, a voltage exists at the junction of resistors 45 and 47 which acts on amplifier 57 to produce an output voltage of the same polarity and duration. As mentioned before, the output of amplifier 57 connects to line 61 which, in turn, acts on varactor 5 through bias network comprising resistors 62, 63, and 64. The error voltage used for fine adjustment of the local oscillator frequency is therefore proportional to the integral over a period of 0.1 seconds duration while the switch 46 is open of the voltage appearing once every 10 seconds at the junction of resistors 45 and 47, plus another signal proportional to the unintegrated voltage at that junction and also existing only for the 0.1 seconds while switch 46 is open.

The present apparatus also has coarse synchronization means which operate to reset the counters 21, 22, 23, 25, and 27. There are two such reset means which will now be described.

One such reset means includes the scaler circuit 70 which has the output D from decade 23 applied to its input. It will be recalled that the output D of decade 23 has a period of 1.0 second. Assuming initial reset to zero of both counters 70 and 71, if 16 pulses D occur without a reset pulse occurring via line 69 and being applied to scaler circuit 70, an output from circuit 70 will pull over the binary 71 which, in turn, will produce an output for turning on the switch 72. Once switch 72 is turned on it continues in the on state until a reset pulse occurs on line 69. The input of switch 72 is fed from pulser 33. When switch 72 is on, this input pulse produces a reset pulse on line 74 which is applied to scaling circuits 21, 22, and 23, resetting them all to the zero state. If the 1.0 second pulses from the Standard Time Signal pulser 33 are in close synchronism with the counting of the counters 21, 22, and 23, then reset pulses will appear on the wire 69, because output pulses from the pulser 33 coincide in time with switch 73 being in the on state. The switch 73 is turned on by the signal H, and then it is turned off again by the subsequent J signal. Once the reset occurs via line 69 sixteen input pulses D from the output of scaling circuit 23 are required to pull over binary 71 so that as long as one reset action on line 69 occurs before 16 input pulses D are counted by scaling circuit 70, the binary 71 will never be pulled over and switch 72 will remain off.

The overall action of the coarse synchronization just described will now be explained. Suppose that the equipment has not been previously operating and that the received 1.0 second Standard Time Signals from WWV do not occur within plus or minus 0.05 seconds of the 1.0 second output change from decade 23. Under these conditions, no output from pulser 33 should occur while switch 73 is on, and counter circuit 70 should count pulses D without resetting until binary 71 is pulled over, turning on switch 72. The next 1.0 second burst from WWV following the change of state of binary 71 will cause an output pulse from pulser 33 to pass through switch 72, and a reset pulse will appear on line 74, immediately resetting to the zero counter decade 21, scaling circuit 22, and decade 23. This reset state in decade 21, scaling circuit 22, and decade 23 actuates gate 38 and thereby turns on switch 35 while the pulse from pulser 33 is still present at the input of switch 73. Switch 73, therefore, has an output which resets scaling circuit 70 and binary 71, turning off switch 72.

Recalling that the local timing chain in the receiver is locked by a crystal-controlled oscillator, it should, therefore, under the most severe conditions, have an output frequency very close to the desired 408 KHz, and therefore the next zero state for decade 21, divider circuit 22, and decade 23 should occur very close in time to the next pulse from pulser 33 caused by the next 1.0 second burst from WWV. Earlier in this disclosure, four possible timing relationships between the output of pulser 33 and the gating switches 35 and 37 were enumerated. The reset action described above eliminates the fourth possibility, i.e. that no pulse from pulser 33 will occur while switches 35 and 37 are closed. Assume, therefore, that situation No. 1 exists, namely, that the pulse from pulser 33 occurs while switch 35 is turned on. The resulting input to integrator amplifier 42 will be positive, moving the output of amplifier 42 slightly in the negative direction. This process continues with each pulse from pulser 33 at 1.0 second intervals until gate 48 produces an output due to the right combination of signals from decades 23 and 25. This output opens switch 46, un-grounding the integrator amplifier 42 loop to permit its output to be brought to zero in a time proportional to the integrated voltage which it contains. The result is an immediate negative-going error signal from amplifier 57 due to the signal to the non-inverting input together with a slight shift in the steady-state output due to a change in the output from integrator amplifier 50 driving the inverting input of amplifier 57.

The result of the error signal from amplifier 57, acting on varactor diode 5, is to increase the effective capacity of the varactor 5 by a considerable factor while the effect of the non-inverting input pulse to amplifier 57 is felt, followed by a slight change in the d-c level at the varactor cathode due to the output from amplifier 50 applied to the inverting input of amplifier 57. The result is a significant decrease in the frequency of the oscillator controlled by crystal 1 for the duration of the large negative-going signal to the cathode of varactor 5, followed by a slight decrease in frequency due to the small negative-going shift of the level at the output of amplifier 57.

It was initially assumed in the foregoing that the pulse from pulser 33 occurs while switch 35 is turned on, that is, in the 0.05 second period following a zero count in decade 23. The objective is to have the pulse from pulser 33 occur partly in the 0.05 second period preceeding the zero condition in decade 23 and partly in the 0.05 second period following the change to zero. Decreasing the frequency of the oscillator controlled by crystal 1 will lengthen the time between changes to zero by decade 23 and hence change the timing between the pulses from pulser 33 and the count condition in decade 23 so as to have overlap of the pulser output and the on time of switch 37. As soon as overlap occurs, the signal to the input of integrator-amplifier 42 will have a negative-going component followed by a positive-going component. A point will be reached where the two components are equal and opposite, having a zero net change on the output of amplifier 42, at which time the level on wire 61 will stabilize until oscillator drift causes a new error signal to occur.

When the level 61 stabilizes, the local timing is synchronized to the Standard Time Signals. Any tendency for the frequency of the oscillator controlled by crystal 1 to deviate from synchronism with the signals from WWV results in the on times of gates 35 and 37 shifting either earlier or later with respect to the pulses from pulser 33 so that the equilibrium condition is disturbed. A greater overlap between the on times of one of the switches and the pulses from pulser 33 occurs which, in turn, causes the output of amplifier 42 to move from zero during the intervals between zeroing actions occurring at 10 second intervals. This movement from zero of amplifier 42 changes the bias on varactor 5 in the manner previously described which adjusts the frequency of the oscillator controlled by crystal 1 until equilibrium is achieved again.

When the pulses from pulser 33 occur more in the on time of one of the switches 35 and 37 than the other, it does not mean necessarily that the crystal-controlled oscillator frequency is incorrect. The system also senses phase between the pulses from pulser 33 and the counting of decade 23. It will be recalled that the signal to varactor 5 which is capable of altering the frequency of the crystal-controlled oscillator slightly, further includes a relatively larger signal of short duration concurrent with a slight adjustment in the steady-state bias condition. The large signal changes the oscillator frequency by a significant amount but for a short period, which as the effect of moving the relative phase of the counter outputs including those from decade 21 and decade 23. If the frequency of the crystal-controlled oscillator were sufficiently close to the desired 408 KHz, the large short-duration signal alone would keep the phase of the counting cycle of decade 23 locked to the Standard Time Signal pulses from pulser 33. The average frequency of the crystal-controlled oscillator would be correct without the oscillator ever being at exactly 408 KHz. By making a small adjustment to the steady-state oscillator frequency each time a phase correction is made, the oscillator rapidly reaches the correct frequency and correct phase. From then on only small corrections are required to maintain the synchronized state.

The objective of the circuits thus far described is to adjust the frequency of the oscillator controlled by crystal 1 to 408 KHz and to synchronize the counting action of the counting chain from the crystal-controlled oscillator to the 1.0 second output from decade 23 to the Standard Time Signal from WWV. In order to identify arriving Omega signals as coming from a specific Omega station, it is further necessary to establish local time which is synchronous with Standard Time to an accuracy better than 0.1 second. To accomplish this identification, it is necessary to establish the identity of a specific count condition in terms of the time signals from WWV.

The Standard Time Signals from WWV consist of short bursts of 1000 Hz modulation at 1.0 second intervals with the beginning of each minute marked by a much longer burst of 1000 Hz signal. Filter 31, FIG. 2, selects each 1000 Hz signal from receiver 30 and applies it to the input of detector 32. The output of detector 32 comprises a short pulse of 1.0 second intervals with a much longer pulse at the start of each minute.

This output from detector 32 is applied to the input of a pulse length sensor 80 which produces an output only when a signal is applied from detector 32 for an interval several times longer than the duration of the output due to the 1.0 second bursts. Thus no output occurs from length sensor 80 due to the relatively short bursts of 1000 Hz at 1.0 second intervals but an output pulse does occur during the long burst occurring at the start of each minute.

The output of the length sensor 80 is applied to switch 81, which is turned on by the output of gate 82. Gate 82 has an output turning on switch 81 when it can decode the timing signals E and F in a manner for which it has been prewired, these signals being derived from decade 25 and scaling circuit 27. The coding of gate 82 is such that switch 81 is in the on state during the first second following zero count at each minute. Since the input of decade 25 is a trigger signal occurring once per second and the scaling factor of decade 25 together with that of scaling circuit 27 is 60, the zero condition occurs at 1 minute intervals.

The input of scaling circuit 82 is obtained from the G output of scaling circuit 27 and consists of a timing signal each time the scaling circuit 27 reaches its zero state. Assuming that scaling circuit 83 and binary 84 are initially in their zero state, if no reset pulse occurs from switch 81, four output pulses later from scaling circuit 27, binary 84 will be pulled over. Once pulled over it remains in that state until a reset pulse occurs from switch 81.

When binary 84 is pulled over, switch 85 is turned on. With switch 85 on, the first pulse from length sensor 80 will produce an output from switch 85 which via wire 86 will reset to the zero state decade 25 and scaling circuit 27. The zero state in decade 25 and scaling circuit 27 is the correct coding for producing an output from gate 82 to turn on switch 81. Since the output from length sensor 80 has an appreciable duration, it is still present at the input of switch 81 while it is turned on by the signal from gate 82, and it produces an output which resets to zero the scaling circuit 83 and binary 84, turning off switch 85. The result of these actions is to have the scale-of-60 comprising decade 25 and scaling circuit 27 in a zero state during the first second of a minute as defined by WWV. Sixty seconds later when the next minute burst produces a pulse from length sensor 80, the scale-of-60 should be again in the zero state with gate 82 producing an output signal to turn switch 81 on and allow the signal from length sensor 80 to produce a signal through switch 81 to act as a reset pulse to scaling circuit 83 and binary 84. Since the output from length sensor 80 occurs a fraction of a second later than the start of the minute, the G input of scaling circuit 83 should have received one pulse from scaling circuit 27 since the last reset signal and be registering a single count. As soon as the reset pulse occurs, the scale-of-4 83 is reset to zero. Thus, as long as the count sequence of decade 25 and scaling circuit 27 is properly synchronized to WWV, the count in scaling circuit 83 never reaches four and binary 84 is not pulled over. Switch 85 is accordingly not turned on and decade 25 and scaling circuit 27 are allowed to count without interference.

Should synchronism drift enough that the pulse from length sensor 80 no longer occurs during the second that the binary inputs to gate 82 are coded zero and switch 81 is turned on, no reset signal will occur at the output of switch 81, scaling circuit 83 will register every count signal G received from scaling circuit 27; and when four counts are made, binary 84 will be pulled over, turning on switch 85 and allowing a signal from length sensor 80 to act as a reset pulse to decade 25 and scaling circuit 27 to thereby re-instate synchronism. Note that should a reset pulse occur at any time before four pulses are counted, the reset action for the scalers 25 and 27 does not occur. Suppose, for example, the reception from WWV became so poor that four consecutive minute bursts were missed. The action described above would result in switch 85 being on so that the next minute burst received from WWV would produce a reset pulse to scalers 25 and 27. Unless the primary timing of the divider chain as determined by the 408 KHz oscillator were badly in error, the reset pulse from switch 85 should occur when decade 25 and scaling circuit 27 were registering zero anyhow and no correction would be required.

It will be noted that the action of the circuit just described is similar to the previously described circuit for synchronizing decade 21, binary 22, and decade 23 to the Standard Time Signals using 1.0 second interval bursts from WWV. The factorsof factors of 16 for scaling circuit 70, and four for scaling circuit 83, are to be taken as suggested factors which may be modified in the light of particular experience.

The system does not continuously require the presence of Standard Time Signals. As a matter of fact, once the locally generated timing signals are correct, if the Standard Time Signals are removed, the time during which the system could operate with accuracy is wholly dependent on the stability of oscillator 2. Taking the 10.2 KHz frequency, 360° of phase represents approximately 18 miles. To produce an error of 0.5 miles due to the oscillator 2 being off frequency, it would have to drift approximately 10° between reception of the two Omega signals being compared. The other requirement of the reference oscillations is that of establishing real-time for identification of Omega transmissions. There are two factors mainly determining the stability of oscillator 2: (1) The stability of the oscillator circuit itself; and (2) The stability of the control voltage on line 61. With no output from pulser 33 (no signal received from WWV), the stability of the voltage on line 61 depends on the drift of amplifiers 50 and 57. By making the circuitry quite stable, the system can still be made to function properly under circumstances where the WWV signal is undergoing selective fade and is lost for substantial intervals of time.

OMEGA PHASE MEASUREMENTS

The divider means described above also provide a local source of reference oscillations for use in the Omega receiver at 10.2, 11.66 and 13.6 KHz, which reference oscillations appear on the wires 16, 15, and 14 respectively, and are selected one at a time by the switch 19 referred to above in connection with FIG. 1.

The actual receiver for the Omega Signals is quite straight forward in design. FIG. 3 shows a suitable design in block diagram form. The receiver should have a good noise figure, a very narrow bandwidth of, say, 10 Hz and a gain of several million. One important factor in the receiver design is that the phase characteristic of received signals must be maintained constant regardless of the degree of overloading.

Referring to FIG. 3, because the received frequency is very low, from 10.2 to 13.6 KHz, the antenna 101 normally cannot be long enough to approach a resonant condition. Bandpass filter 102 is designed to apply as much energy as possible from antenna 101 to the input of amplifier 103 and at the same time restrict the bandwidth to a reasonable figure such as, for example, 15 Hz. The output of amplifier 103 is fed through bandpass filter 104 to amplifier 105. Again, filter 104 accomplishes matching between the output of amplifier 103 and the input of amplifier 105 while restricting the bandwidth still more. It should be recognized that both filter 102 and filter 104 may be partly composed of electro-mechanically resonating elements, for example, quartz crystals. Again, more than two amplifier stages and two bandpass filters may be employed. Since the receiver must select one of three separate frequencies, either the bandpass filters 102 and 104 must be variable and ganged together for tuning in unison (as illustrated), or else they must have three fixed-tuned channels which are selectible by tap-switch tuning. FIGS. 1 and 3 show the tuning controls of the filters 102 and 104 ganged together with the wiper of switch 19 to provide a single tuning control T by which a particular Omega signal frequency is selected by the operator.

The main objective measurement-wise of the Omega system is to measure the phase between two discontinuous sinusoidal signals, which never exist at the same time, as though they were continuous. To accomplish such a measurement, some form of phase memory is required. In this disclosure, the memory function is accomplished by shifting the phase of a locally generated reference oscillation with respect to the phase of the transmitted Omega signal received from a chosen firsm Omega station. The reference signal thus established exists continuously and is kept in proper phase by automatic adjusting circuitry. The phase between this established signal and a second received Omega signal originating from a different Omega station is then, in effect, measured. The resulting answer indicates the phase that the received Omega signals from the two different stations would have if they existed simultaneously. This process can be repeated as many times as desired within the limitation of the number of stations receivable in a particular location at a given time.

FIG. 3 shows in block diagram form a two-channel phase shifting and comparison means for the measurement of phase between two Omega signals which never exist simultaneously. It should be understood that the proper inputs as to reference frequency and timing signals are supplied by the means shown in FIG. 2, as previously described. For instance, if signals from Omega stations operating on 10.2 KHz are to be compared, obviously the reference oscillation selected by frequency switch 19 must be also 10.2 KHz.

The reference oscillation is applied via line 111 to the input of differentiator 112. It will be recalled that the oscillation input is in the form of square waves. The differentiator 112, therefore, produces one negative-going pulse each cycle. This pulse is fed through diode 115 to the input of delay 117. Oscillation line 111 also feeds the input of inverter 113. The output of inverter 113 is a square wave like the input but 180° displaced in phase. The output of differentiator 114 fed by the inverter 113 includes also a negative-going pulse each cycle of the reference oscillation, but these pulses lie mid-way between the pulses produced by differentiator 112 (timewise). The output of differentiator 114 is fed through diode 116 to the trigger input of delay 117. Delay 117 is thus triggered twice per cycle of reference input.

Delay 117 and delay 118 are similar circuits. In response to triggering by a negative input pulse the circuit resets later and emits an output pulse after a delay determined by the voltage level on line 119 feeding the control input. When delay 117 resets, the resulting output immediately triggers delay 118 and when it resets, a trigger pulse is sent to the clock input of flip flop 122. The result is that the output of flip flop 122 corresponds in frequency to the reference oscillation input but lags in phase by an amount determined by the sum of the delay times of delays 117 and 118, plus an additional, presently-described, factor which may be zero or 180°. Each output pulse from delay 118 to the clock input of flip flop 122 changes the state of flip flop 122 but does not exercise control as to which state exists following a specific clock pulse. To control this characteristic, a second delay 121 is triggered at half the rate of delay 117 by receiving only the output of differentiator 112. The delay time of delay 121 also is controlled by the voltage on line 119. The delay time of delay 121 is made to be always slightly greater than the combined delays of delay 117 and 118.

The output of delay 121 is fed to the input of switch 123 and to the input of switch 124 as well. These switches are controlled in such a way that both switches cannot be on at the same time. Assuming for the moment that switch 123 is on, the output of switch 123 is applied to the trigger input of the left side of flip flop 122. Thus whenever a pulse occurs from delay 121, subsequently the left-hand section of flip flop 122 must be non-conducting. Suppose the clock input to flip flop 122 from delay 118 made the left-hand section of flip flop 122 non-conducting following every pulse directly preceeding the pulse through switch 123. The action of the flip flop would be undisturbed by the output from switch 123 since the flip flop would already be in the correct state each time a pulse occurred. Suppose now that switch 123 were turned off and switch 124 were turned on with other conditions being unchanged. The first pulse from switch 124 would find flip flop 122 in the wrong state and would immediately pull it over to turn off the right-hand side. From then on the toggle action would keep flip flop 122 producing an output as before but 180° displaced from that which existed when switch 123 was on.

The action thus far described produces a signal from flip flop 122 which has the same form as the input reference oscillation on line 111, but displaced in phase by the number of electrical degrees represented by the delays of delay 117 plus that of delay 118 plus either zero or 180° depending on whether switch 123 or switch 124 is on. The reason for using two delay circuits 117 and 118 instead of one to provide the toggle input to flip flop 122 is that delays up to 180° are needed and since a trigger pulse is provided at 180° intervals, no reset time would be available if one delay circuit only were used. With the two circuits, the first delay 117 can reset and be triggered again before the second delay 118 resets. The single delay 121 is triggered at half the rate and has adequate time to reset after the longest delay required.

The control signals for switch 123 and 124 are provided by two opposite outputs from polarity sensor 126. One switch is turned on if the input to polarity sensor 126 is positive, and the other switch if that input is negative. The input to polarity sensor 126 is obtained from the output of phase detector 125. A typical phase detector of a type suitable for use as detectors 125, 225, 131, and 231 has two inputs, both of which may be sinusoidal in form or one or both may be square waves. The average output from the device is zero when the two input signals have a 90° phase displacement, irrespective of the amplitude of the signals. If the phase differential increases from the 90° null, the average output from the phase detector has one polarity. If the phase differential decreases, the output has the other polarity. The actual sign of the polarity for an offset from the null in a given direction can be determined by the manner of connecting the inputs. The same action occurs if the two input signals are displaced in phase by 270°, except that the average output has the opposite polarity for a displacement in phase in a given direction from the null. To explain more fully, starting with the two signals to a phase detector mutually in phase, assume a positive output. If the relative phase displacement of the two signals is now increased, the output will fall off as the null at 90° phase displacement is approached. At 90° the output is zero. As the phase displacement is further increased the output builds up with a negative polarity. The output remains negative until the null at 270° is reached. At 270° the output is zero again. Beyond 270° the output polarity is positive and remains so through zero phase displacement to the null at 90°.

Referring back to FIG. 3, the coarse phase detector 125 receives one input on wire 130 from the Omega receiver tuned to the desired frequency. The other input to phase detector 125 is the reference oscillation on line 111. If the phase displacement of the reference input with respect to the Omega signal input is from 90° to 270°, the output from phase detector 125 to polarity sensor 126 is positive. A positive input to polarity sensor 126 produces an output on line 127 to turn on switch 123. With switch 123 on, the action which has already been described, the reference signal oscillation from flip flop 122 will have a phase with respect to the reference oscillation equal to the phase equivalent of the time delay through delay 117 and 118 plus zero. If, on the other hand, the phase displacement between the Omega signal and the reference oscillation were from 270° to 90°, switch 124 would be on and the phase displacement between the reference oscillation input and the output reference signal from flip flop 122 would be the delay equivalent plus 180°.

The amount of the automatic shift in phase required to obtain a first reference signal on wire 211 from said input reference oscillation will now be discussed. This circuitry includes a fine phase detector 131 which has one input supplied by the Omega signal from the receiver on line 130. The other input is the reference signal output from flip flop 122. The action of phase detector 125 and its subsequent circuits insures that the output from flip flop 122 is within 180° of the correct phase with respect to the Omega receiver output. Assuming that switch 132 is on, the output of phase detector 131, representing the relative phase of the two signals as a plus or minus voltage of appropriate magnitude, is applied to the input of integrator 133. If this input is negative, the output of integrator 133 will be positive-going so that the voltage on line 119 will be increasing. As had been mentioned before, the time delay of delay 117 and 118 is proportional to the voltage on line 119. As this voltage increases, so will the delay and hence the phase displacement between the reference signal output of flip flop 122 and the Omega signal output of the receiver will also be increasing. This process continues until the null in the output of phase detector 131 occurs. At this point the system is in equilibrium with the phase of the reference signal from flip flop 122 controlled so that a predetermined phase relationship of 90° is maintained with respect to the Omega signal. A deviation from the null condition in either direction results in an output voltage from phase detector 131 such as to change the output from integrator 133 to control the phase of the output from flip flop 122 back to the null situation.

Thus far we have treated the first Omega signal from the receiver as though it were a continuous signal from one station. Such is not the case, however, because the transmission from each Omega station on a selected one of the frequencies occupies only one time slot in each 10 second time slot cycle, with the start of a cycle coinciding with the start of a minute of Standard Time Signal time. The outputs of the Omega receiver feeding one input of phase detector 131 will be the result of several Omega stations broadcasting in their predetermined time slots with no two stations ever on at the same time. The signal from one of these stations only must be selected to control the phase of the reference signal from flip flop 122. Switch 132 permits the output of phase detector 131 to influence the output of integrator 133 when in the closed condition. When open, switch 132 effectively isolates integrator 133 so that the integrator output remains constant. If, therefore, switch 132 is closed during the reception of one specific Omega signal in one time slot only, then the integrator 133 will respond to that signal alone and will be unaffected by signals from other than the selected station.

Switch 132 is controlled by the output from flip flop 137. The state of flip flop 137 is, in turn, determined by gates 136 and 141. The connections are so arranged that a pulse from gate 136 leaves the output of flip flop 137 such that switch 132 is on. A subsequent pulse from gate 141 pulls flip flop 137 back to produce an output such that switch 132 is off. Gate 136 has a binary coded input on wires C which input is derived from decade 23, FIG. 2, which is changing at a rate of 10 counts per second. The binary input on wires E to gate 136 is the binary-coded output from decade 25, FIG. 2, which registers one count per second. The gate 136 is coded to produce an output to pull over flip flop 137 for specific counts registered simultaneously on decades 23 and 25, and representing the start of the first selected Omega signal time slot. Simultaneously, gate 141 has C and E inputs which are derived also from decades 23 and 25. As soon as the correct count marking the end of the same selected time slot is decoded by the gate 141, switch 132 is turned off and remains off until turned on again by the gate 136. To take an example, suppose a particular Omega station emitted its signal starting at 3.7 seconds and ending at 4.8 seconds after the start of each 10 second period. Gate 136 would be coded for 7 at inputs C and for 3 at inputs E 135 to bring the switch on at 3.7. Similarly, inputs C of gate 141 would be coded for 8 and inputs E coded for 4 to turn off switch 132 at 4.8. As a result, switch 132 would be on from 3.7 to 4.8 seconds after the start of each 10 second interval which coincides with the emission period of the desired Omega station and renders integrator 133 responsive to those signals alone. The phase displacement between the reference signal output 211 of flip flop 122 and the Omega signal output of the Omega receiver on line 130 during the time the selected Omega station is on will be held at 90° by shifting the reference signal.

In FIG. 3, the channel No. 2 block diagram is designated by numbers from 211 to 241 inclusive to represent elements having similar functions to those already described with relation to channel No. 1 including elements from 111 to 141 inclusive. For example, differentiator 212 has a similar function to differentiator 112. The input to channel No. 2 consists of a second selected Omega signal from receiver line 130 and the first reference signal from flip flop 122 on line 211. The coding of gate 236 and gate 241 will be chosen to select a second Omega signal from a station broadcasting in a different time slot during each time slot cycle. As in the case of the first channel, it is the combination of the phase detector 225, polarity sensor 226, switches 223 and 224, and delay 221 which insures that the output of flip flop 222 is within 180° of the phase of the second Omega signal. The composite delay of time delays 217 and 218, therefore, need never supply an equivalent phase displacement greater than 180°.

The purpose of channel No. 2 is to generate in flip flop 222 a second reference signal by beginning with an input signal on line 211 based on the first reference signal from flip flop 122 and finding out the amount by which the latter must be shifted in order to bring it into the same predetermined 90° phase relationship with the second received Omega signal as the first reference signal now occupies with respect to the first received Omega signal. This shift amount then directly represents the relative phase difference between the first and second received Omega signals.

Figure 4:
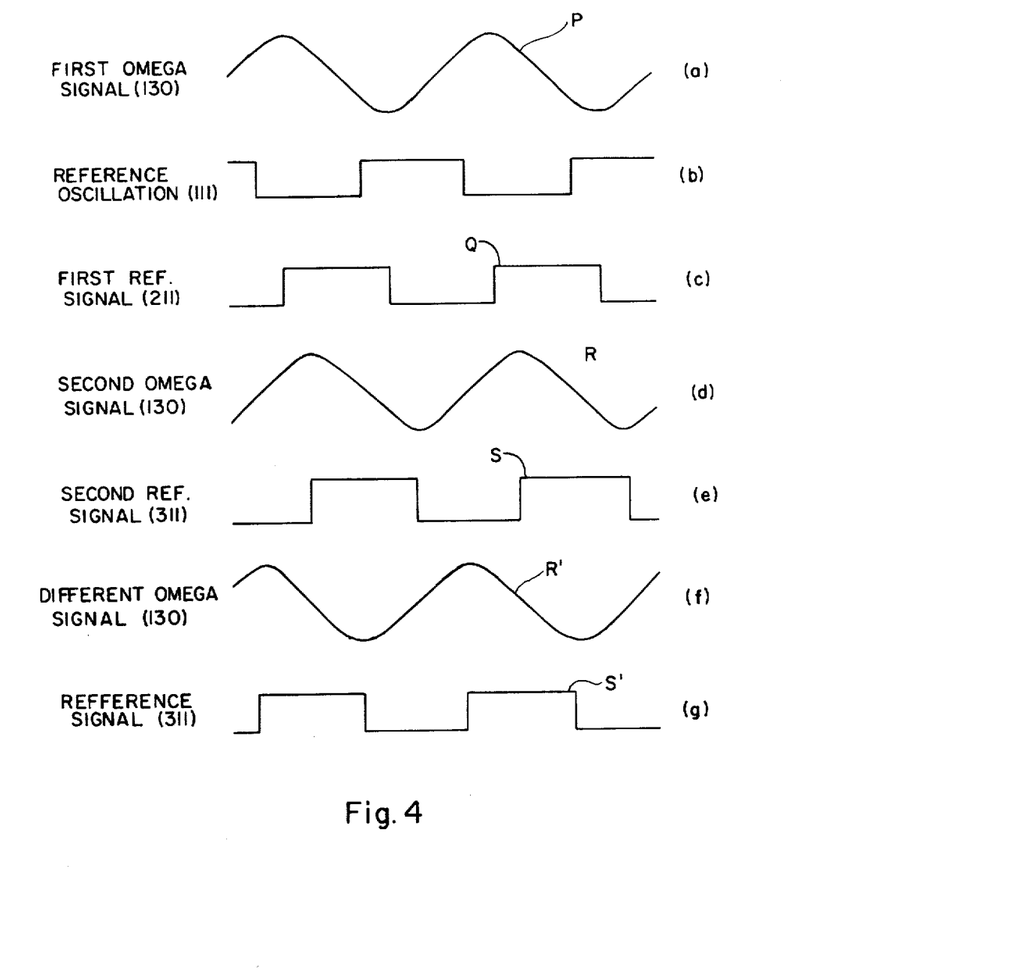
FIG. 4 is a collimated group of seven wave forms illustrating typical phase relationships within the circuitry of FIG. 3.

Referring to FIG. 4, assume that waveform (a) represents the first received Omega signal P applied to line 130, FIG. 3. This signal exists for approximately 1 second during every 10 second time slot cycle. The oscillation input from the oscillator divider chain which arives on line 111, FIG. 3, is indicated at waveform (b), and it is continuous. The phase displacement of this oscillation with respect to the Omega signal P may have any value. The circuitry in channel No. 1 adjusts the phase of the first reference signal Q on wire 211 from flip flop 122, FIG. 3, such as to produce a phase displacement of Q with respect to the first Omega signal P equal to 90°, as can be seen by comparing the signal (a) and the signal (c), FIG. 4. The first reference signal Q as shown at (c) is produced by displacing the phase of (b) by some amount, the value in this case being 225°. It will be recalled that this phase displacement is achieved by the sum of the delay equivalents of delay 117 and 118 plus either zero or 180°. In this case, since the phase displacement is greater than 180° the delay circuit contributes 45° while the remaining 180° is obtained by selection of the correct triggering of flip flop 122, FIG. 3, to produce a 180° minimum displacement.

The second received Omega signal R is represented at (d), FIG. 4. While for the sake of clarity, this signal R is shown existing simultaneously with the first Omega signal P, actually these two signals do not exist at the same time. The purpose of the circuitry in channel No.

2 is to produce a second reference signal S at the output of flip flop 222, FIG. 3, which is 90° phase displaced with respect to the second Omega signal R on line 130, and is continuous. The output S from flip flop 222 on line 311 is indicated at (e), FIG. 4. The phase of the second Omega signal R can have a value from 0° to 360° with respect to the signal P from the first Omega station. For purposes of illustration, FIG. 4, shows a displacement of 45°. Recalling that the phase displacement between (c) and (e) must also be 45°, then this phase displacement will be obtained by starting with the reference signal Q and combining the sum of the fine time delays of delay 217 and 218 plus a coarse delay of either zero or 180° to obtain a reference signal S. For a 45° displacement the coarse delay should be zero, so that the required overall delay will be contributed by the fine delay means 217 and 218 only.

To take another example, suppose the second Omega signal R' is as shown in (f), e.g. a displacement of 315° with respect to the first Omega signal P. Again, the output S' from flip flop 222 must be displaced 90° in phase as shown at (g), FIG. 4. The system seeks to determine the phase displacement between (g) and (c), which is also 315°. This displacement will be represented by the sum of the two fine delays 217 and 218 plus, in this case, a coarse displacement of 180°.

The desired output of the over-all Omega apparatus is the display of the phase difference between the second reference signal S and the first reference signal Q. These phases represent the phases of the first Omega signal P and the second Omega signal R but both displaced 90°, which represents said arbitrary relationship at which the phase detectors null. Thus the output Q of flip flop 122 is related to the first Omega signal P as:

$$Q = P\ 30\ 90°,\ \text{or}\ P = Q - 90°$$

Similarly, the output S of flip flop 222 is related to the second Omega signal R as:

$$S = R + 90°,\ \text{or}\ R = S - 90°$$

Therefore, the relationship between the second reference signal S and the first reference signal Q is:

$$S = Q + X$$

where $X$ is the composite of the time delay 217 plus delay 218, therefore, $$R = S - 90° = Q + X - 90°$$

since $$Q = P + 90°$$

$$R = P + 90° + X - 90° = P + X$$

The desired answer is the phase difference between the first Omega signal P and the second Omega signal R, e.g. $R - P$ $$R - P = X$$

In other words, the phase difference between the signals from the first and second Omega stations is fully represented by the total delay introduced by delay circuits 217 and 218. As previously stipulated, this delay is proportional to the voltage at the control inputs of delays 217 and 218 on line 219. A measure of this voltage, therefore is a measure of the phase difference between R and P.

The voltage on line 219 is applied through resistor 253 to a first input of combining amplifier 255. The desired level at the output of amplifier 255 is determined by the ratio of resistor 254 to resistor 253. The output of amplifier 255 is applied to the output phase indicator 256 which can read out the answer in the desired units because of pre-calibration. There is a second input also going to the combining amplifier 255 through resistor 252. The holding amplifier 251 is sensitive to input obtained from polarity sensor 226 only when gated on by the signal from flip flop 237 which occurs during the transmission of the selected second Omega signal R. It will be recalled that the total phase shift capabilities of the delays (delay 117 and 118 in the first channel, and delays 217 and 218 in the second channel) respectively cover 180°, and that the polarity sensor 126 (226 in the second channel) determines whether or not another 180° is to be added. If only the fine phase shift of the delay circuits is to be registered, the output of polarity sensor 226 to holding amplifier 251 is zero during the time it is sensitive to that particular Omega input signal. The continuous output of holding amplifier 251 is also zero and there is no effect on output indicator 256. If, on the other hand, 180° of coarse shift is to be added, the output of polarity sensor 226 has a specific value during the presence of the selected Omega signal R as signalled by output from flip flop 237. The output of holding amplifier 251 will also have specific value which, due to the holding action, will be continuous. This output is applied through resistor 252 to the input of combining amplifier 255. The output of combining amplifier 255 represents the sum of the inputs representing the fine phase shift of the delay plus a coarse constant which is made equivalent to 180° at the readout of output indicator 256 by selected components of the circuit.

This invention is not to be limited to the exact form shown in the drawings, for obviously changes can be made within the scope of the following claims.

What I claim as my invention is:

1. Omega Navigation receiver apparatus for determing the phase relationship between multiple Omega signals of the same frequency which are transmitted successively by different Omega transmitters according to a predetermined repeating real-time cycle, and the apparatus using time signals broadcast from a Standard Time Signal station to identify the sources of said Omega signals, by determining their positions in said repeating cycles comprising in the apparatus:
   a. a receiver for receiving the Omega signals and a receiver for receiving said Standard Time Signals;
   b. a reference oscillator generating an oscillation;
   c. frequency divider chains connected to divide the frequency of said oscillation to obtain a reference oscillation of the same frequency as said transmitted Omega signals, and to obtain timing signals representing the moments during each cycle of transmission of said successive Omega signals by said Omega transmitters;
   d. comparison means connected to receive said Standard Time Signals and the locally-generated timing signals and to compare their relative times of occurrence and including timing correction means responsive to said relative times of occurrence to bring these signals into coincidence;
   e. means for selecting certain Omega signals from their positions in the repeating time cycle;

f. first phase shifting means operative to shift the phase of said reference oscillation to provide a first reference signal having a predetermined phase relationship with respect to a first selected one of said received Omega signals;

g. second phase shifting means operative to shift the phase of a signal based on the first reference signal to provide a second reference signal having said same predetermined phase relationship with respect to a second selected one of said Omega signals; and h. indicator means responsive to the amount of phase shift performed by said second phase shifting means to indicate the phase difference between the first and second Omega signals.

2. Receiver apparatus as set forth in claim 1, wherein the divider chains to obtain said timing signals have reset means comprising said timing correction means, and said Standard Time Signals actuate means to reset the divider chains at real-times corresponding with the said repeating cycles when the timing signals are out of step with the Standard Time Signals.

3. Receiver apparatus as set forth in claim 2, wherein said comparison means includes means for obtaining error signals as a result of comparing said timing signals and said Standard Time Signals by determining when said error signals exceed predetermined amounts, and means for actuating said reset means when the error signals exceed said predetermined amounts.

4. Receiver apparatus as set forth in claim 3, wherein said oscillator includes oscillator frequency control means, and said apparatus further includes means coupling the error signals to the frequency control means to reduce the error and bring said timing signals into coincidence with said Standard Time Signals.

5. Receiver apparatus as set forth in claim 3, wherein means for counting the number of times the Standard Time Signals fails to coincide with the timing signals and for delaying actuation of said reset means until a predetermined number of failures have occurred.

6. Receiver apparatus as set forth in claim 1, wherein said Standard Time Signals are received marking each new minute and each new second, and said repeating time cycles start anew every 10 seconds, said counter chains including counters counting 0.1 second, 1.0 second, 10 seconds, and 1 minute intervals, recognition means for distinguishing between Standard 1-second signals and Standard 1-minute signals and said timing signal divider chains having reset means, the recognized 1-minute Standard Time Signals being connected to reset the 10-second and 1-minute counters and said 1-second Standard Time Signals being connected to reset the 0.1 second and 1.0 second counters.

7. Receiver apparatus as set forth in claim 1, wherein said oscillator includes oscillator frequency control means and said timing correction means includes recognition means for recognizing Standard 1-second Time Signals, gate means driven by said timing signals and delivering a gating signal just prior to the beginning of each new second and a gating signal just after the beginning of each new second, and means for determining when a Standard 1-second Time Signal falls within one of said gating signals to deliver a plus or minus output, means for integrating said outputs to obtain a correction signal and means for applying said correction signal to said oscillator frequency control means to make said plus and minus outputs balance out.

8. Receiver apparatus as set forth in claim 1, wherein said first phase shifting means including means for generating said first reference signal at the rate of said reference oscillation, coarse phase detector means receiving said first selected Omega signal and said reference oscillation and actuating said generating means to deliver said reference signal in the closest 180 degree relationship to said first selected Omega signal, and fine phase detector means coupled to drive delay means for shifting the phase of the generating means to deliver said reference signal precisely in said predetermined phase relationship with respect to said first selected Omega signal.

9. Receiver apparatus as set forth in claim 8, wherein said second phase shifting means including means for generating said second reference signal at the rate of said first reference signal, coarse phase detector means receiving said second selected Omega signal and said first reference signal and actuating said generating means to deliver said second reference signal in the closest 180 degree relationship to said second Omega signal, and fine phase detector means coupled to drive delay means for shifting the phase of the generating means to deliver said reference signal precisely in said predetermined phase relationship with respect to said second Omega signal.

10. Receiver apparatus as set forth in claim 9, wherein said coarse phase detector means which is coupled to receive the second Omega signal delivering outputs to control the phase of the second reference signal generating means, and said indicator means receiving and summing said outputs and displaying a value proportional to their sum to indicate the phase difference between the first and second Omega signals.

11. Apparatus as set forth in claim 1, wherein said Omega signals being transmitted in predetermined swquence during said repeating time cycles each in a uniquely assigned time slot, and said means for selecting certain Omega signals comprising gate means coupled to receive said timing signals and operative to decode them to represent the unique time slots respectively occupied by the Omega signals being selected, and said gate means being coupled to pass to said phase shifting means only those Omega signals received during the decoded time slots.

12. Omega Navigation receiver apparatus responsive to multiple received Omega signals of the same frequency, transmitted from different locations in uniquely assigned time slots forming a repeating time cycle to determine the relative phases of said Omega signals using a local oscillator for generating reference oscillations of the same frequency to provide reference signals by which the phases of the Omega signals are compared, the improvements comprising: means for receiving broadcast Standard Time Signals, means for generating from said oscillations timing signals representing boundaries of said time slots, automatic means for controlling said oscillator and said generating means to keep the timing signals synchronized with said Standard Time Signals, and means for decoding said timing signals to identify at the receiver apparatus time slots in repeating cycles to thereby identify the Omega signals transmitted therein.

13. Receiver apparatus as set forth in claim 12, wherein said timing signal generating means comprising dividers driven by said local oscillator and said dividers having reset means; and said automatic controlling means including gate means decoding said timing signals and enabling said reset means at times other than the times of expected occurrence of said Standard Time Signals and means for coupling Standard Time Signals to the dividers whereby if the Standard Time Signals occur during intervals when the reset means are enabled, the dividers will be reset thereby.

14. Receiver apparatus as set forth in claim 12, wherein said local oscillator includes oscillator frequency control means, and said apparatus includes means responsive to the times of occurrence of said timing signals and said Standard Time Signals for developing error signals, and means coupling the error signals to the frequency control means to reduce the error and bring said timing signals into coincidence with said Standard Time Signals.

15. Receiver apparatus as set forth in claim 12, wherein said means for decoding the timing signals being coupled to means to select two Omega signals at a time whose phases are to be compared using said reference oscillations.

* * * * *